US005940172A

United States Patent [19]
Ball

[11] Patent Number: 5,940,172
[45] Date of Patent: Aug. 17, 1999

[54] SURVEYING APPARATUS

[75] Inventor: Stephen Ball, Banchory, United Kingdom

[73] Assignee: Measurement Devices Limited, Aberdeen, United Kingdom

[21] Appl. No.: 09/089,987

[22] Filed: Jun. 3, 1998

[51] Int. Cl.[6] .............................. G01C 1/00; G01C 3/00

[52] U.S. Cl. .............................................. 356/146; 356/3

[58] Field of Search .................................... 356/3, 1, 141, 356/152; 340/705; 342/357, 450, 465, 458; 89/41.05, 41.06, 41.07, 41.17

[56] References Cited

U.S. PATENT DOCUMENTS

| 4,930,888 | 6/1990 | Freisleben et al. | 356/152 |
| 5,568,152 | 10/1996 | Janky et al. | 342/357 |
| 5,815,411 | 9/1998 | Ellenby et al. | 364/559 |

*Primary Examiner*—Frank G. Font
*Assistant Examiner*—Michael P. Stafira
*Attorney, Agent, or Firm*—Arnold White & Durkee

[57] ABSTRACT

The present invention provides a surveying apparatus adapted to be worn on the head of user. The surveying apparatus contains components for optical sighting, distance measurement, bearing determination, position fixation, and signal processing. The distance measuring device is preferably a laser distance measuring device.

2 Claims, 5 Drawing Sheets

SURVEYING APPARATUS

BACKGROUND OF THE INVENTION

The invention relates to surveying apparatus.

Conventional surveying equipment uses bulky and heavy equipment which requires to be transported to the surveying location which may not be easily accessible.

Recently, there has been a move to utilising geographical positioning satellite (GPS) location fixing systems in order that a surveyor on the ground may record the exact coordinates of the area being surveyed.

However, to date, such systems have been bulky and cumbersome, requiring an antenna of several meters in length and a heavy electronics pack which make it difficult for the surveyor to access locations which are not easily accessible. Hence, the current systems are not truly portable.

SUMMARY OF THE INVENTION

In accordance with the present invention, surveying apparatus comprises a mounting device adapted to be worn on the head of a user, an optical sighting device mounted on the mounting device to permit the user to select a geographical location to be surveyed, a distance measuring device mounted on the mounting device to measure the distance from the mounting device to the location selected by the user, a compass mounted on the mounting device to determine the bearing from the mounting device to the selected location, a position fixing device to identify the geographical position of the mounting device, and a processing device to receive output signals from the position fixing device, the measuring device, and the compass.

Preferably, the optical sighting device may comprise an optical cross-hair sighting device, and/or a visible light pointing device, such as a pointing laser.

Preferably, the distance measuring device may be a laser distance measuring device or range finder.

Typically, the compass may comprise of fluxgate heading compass.

Preferably, the apparatus may also comprise an inclinometer to determine the angle of the distance measuring device from the horizontal, the inclinometer providing an output signal, indicative of the said angle, to the processing device.

Typically, the position fixing system may comprise a GPS fixing system and preferably, a differential GPS fixing system.

Preferably, the apparatus may also include an activation device operated by a user which instructs the processing device to process the output signals received when the location is selected by the sighting optics.

Typically, the activation device may be incorporated into an input device, such as a keyboard or keypad and which may also have an output device, such as a visual display unit or screen.

In addition, the processing device may include a database with information relating to the selected location stored in the database, and a display device coupled to the processing device such that information relating to the selected location is displayed.

Typically, the apparatus may also include a memory device which stores information processed by the processing device.

Typically, the apparatus may also include video and/or audio tape recording devices to record video and/or audio information, respectively.

An example of surveying apparatus in accordance with the invention will now be described with reference to accompanying drawings, in which:

DETAILED DESCRIPTION OF THE ILLUSTRATED EMBODIMENT

Figure 1:
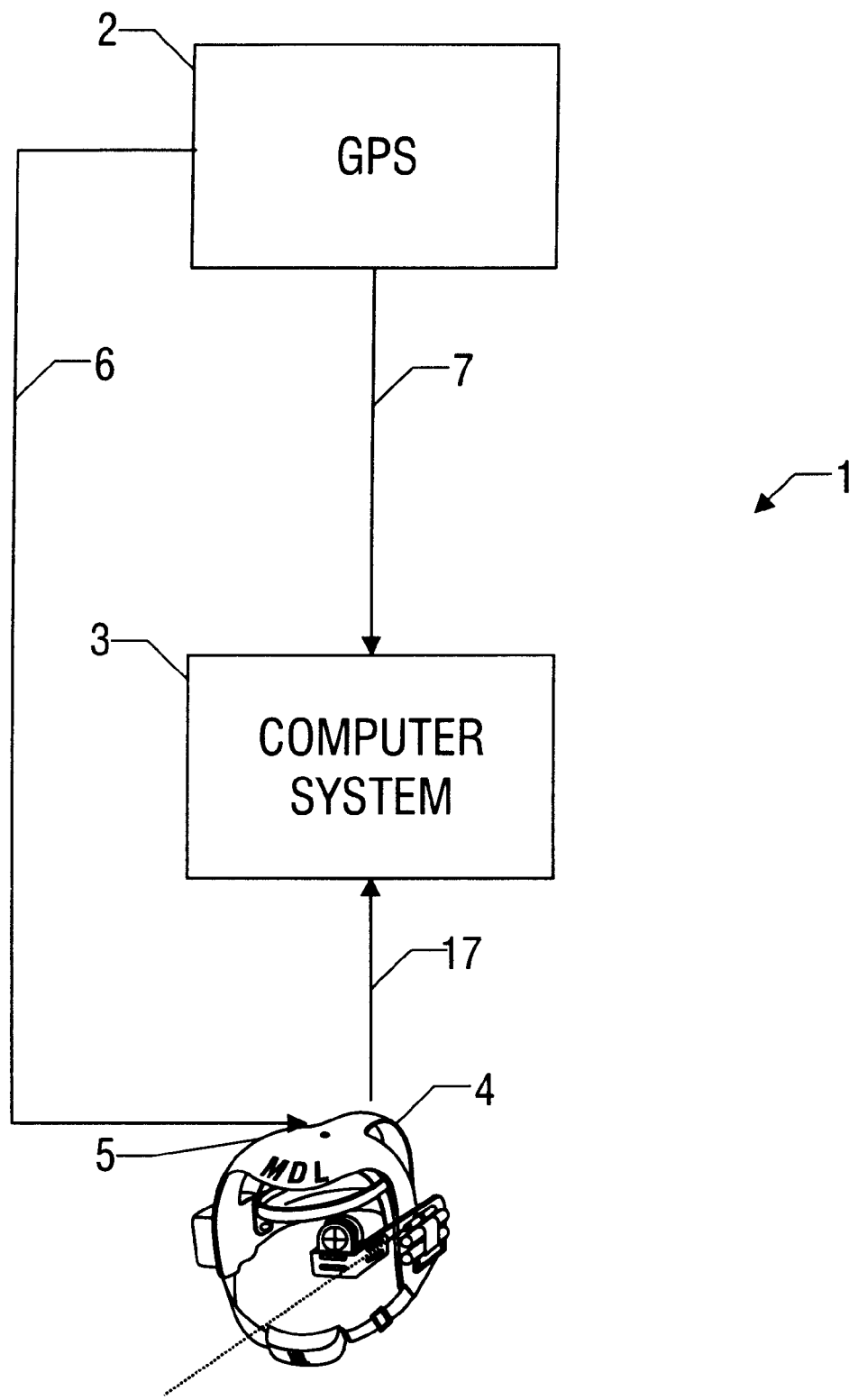
FIG. 1 is a schematic block diagram showing surveying apparatus.

FIG. 1 shows a surveying apparatus 1 which comprises a geographical positioning system (GPS) 2, a processing device in the form of a computer 3 and a headset 4 adapted to be worn on the head of the user. The headset 4 includes a GPS antenna 5 which is coupled to the GPS 2 via an antenna cable 6. Output signals 7 from the GPS 2 are input to the computer 3.

Figure 2:
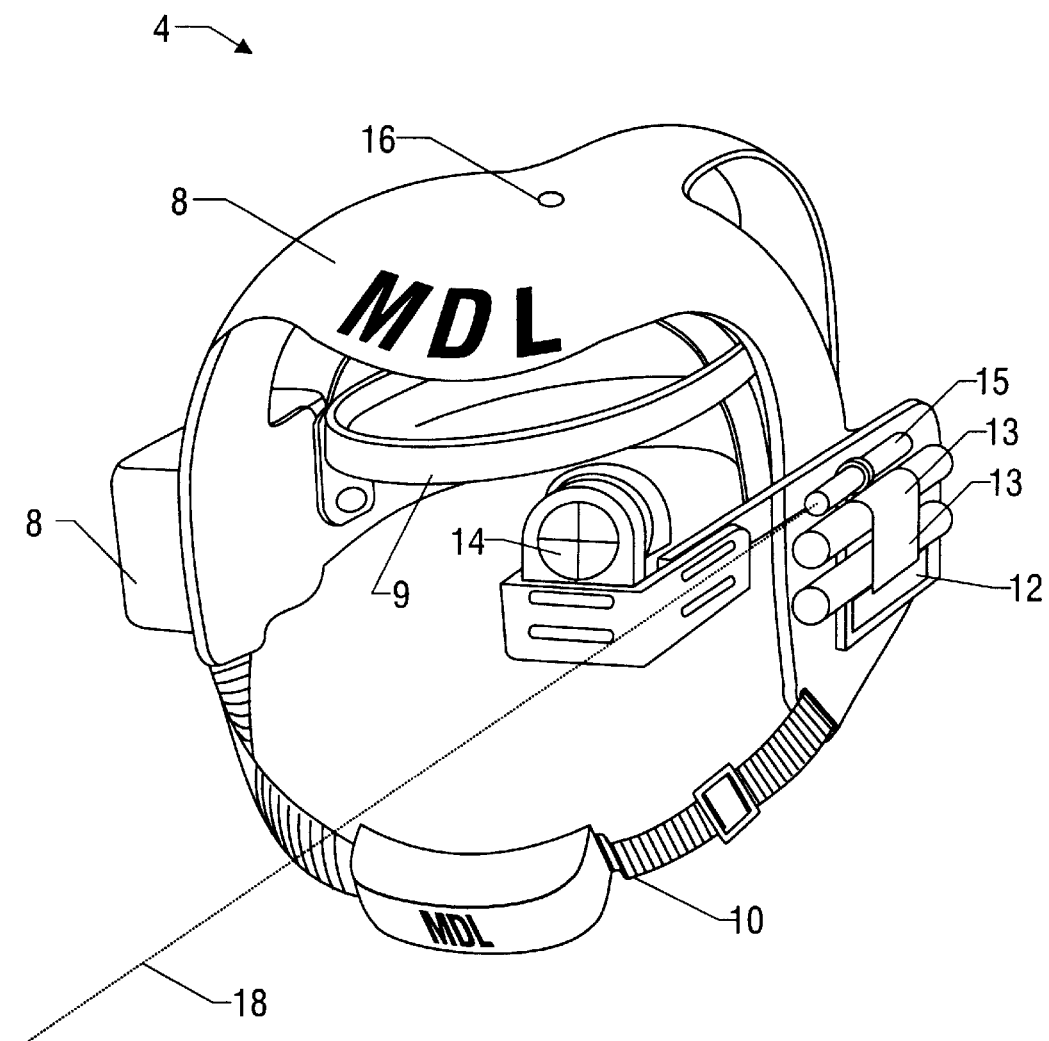
FIG. 2 is a perspective view showing a first example of a headset which may form part of the surveying apparatus shown in FIG. 1.

A first example of a headset 4 is shown in more detail in FIG. 2. The headset 4 includes a frame 8 mounted on a head cradle 9 which fits onto the head of the user. The headset 4 also includes a chin strap 10 connected to the frame 8.

Mounted on the frame 8 is a fluxgate heading compass 11, an inclinometer 12 and a range/distance finding laser system 13. Also mounted on the frame 8 are cross-hair sighting optics 14 and a red visible light pointing laser 15 which emits a visible red pointing light beam 18. In addition, there is also a mounting hole 16 for the GPS antenna 5. The output signals from the fluxgate heading compass 11, the inclinometer 12 and the distance laser system 13 are output on line 17 to the computer system 3.

The computer system 3 receives the information on lines 7 and 17 and may store the information to permit it to be downloaded at a later time. Alternatively, or in addition, the processor may process the information received and display on a display device information relating to a location identified by the user using the sighting optics 14 or pointing laser 15 and determined by the processing system using the signals received on lines 7 and 17.

The apparatus may also include a signalling device coupled to the computer system which is activated by a user to instruct the computer to store the information from the fluxgate heading compass 11, the inclinometer 12 and the range finding laser device 13 and the GPS system 2 on the location selected by the user using the sighting optics 14 and/or pointing laser 15.

Alternatively, or in addition, the processing system may display information relating to the location identified by the user to the user using a suitable display device. For example, the display device and signalling device may be provided by a portable computer or by a combined keypad and display unit.

Figure 3:
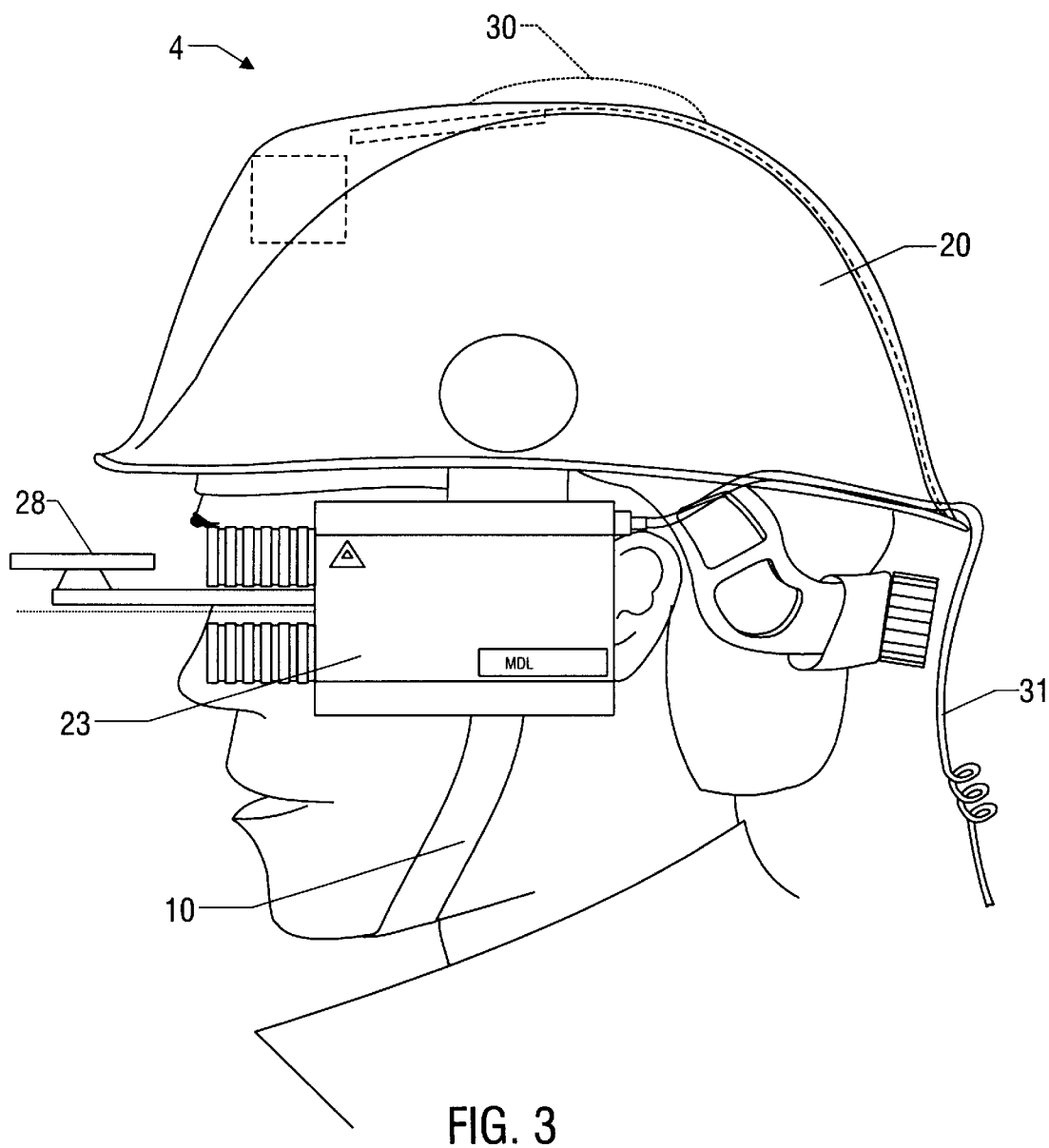
FIG. 3 is a side view of a second example of a headset in use and which may form part of the surveying apparatus shown in FIG. 1.
Figure 4:
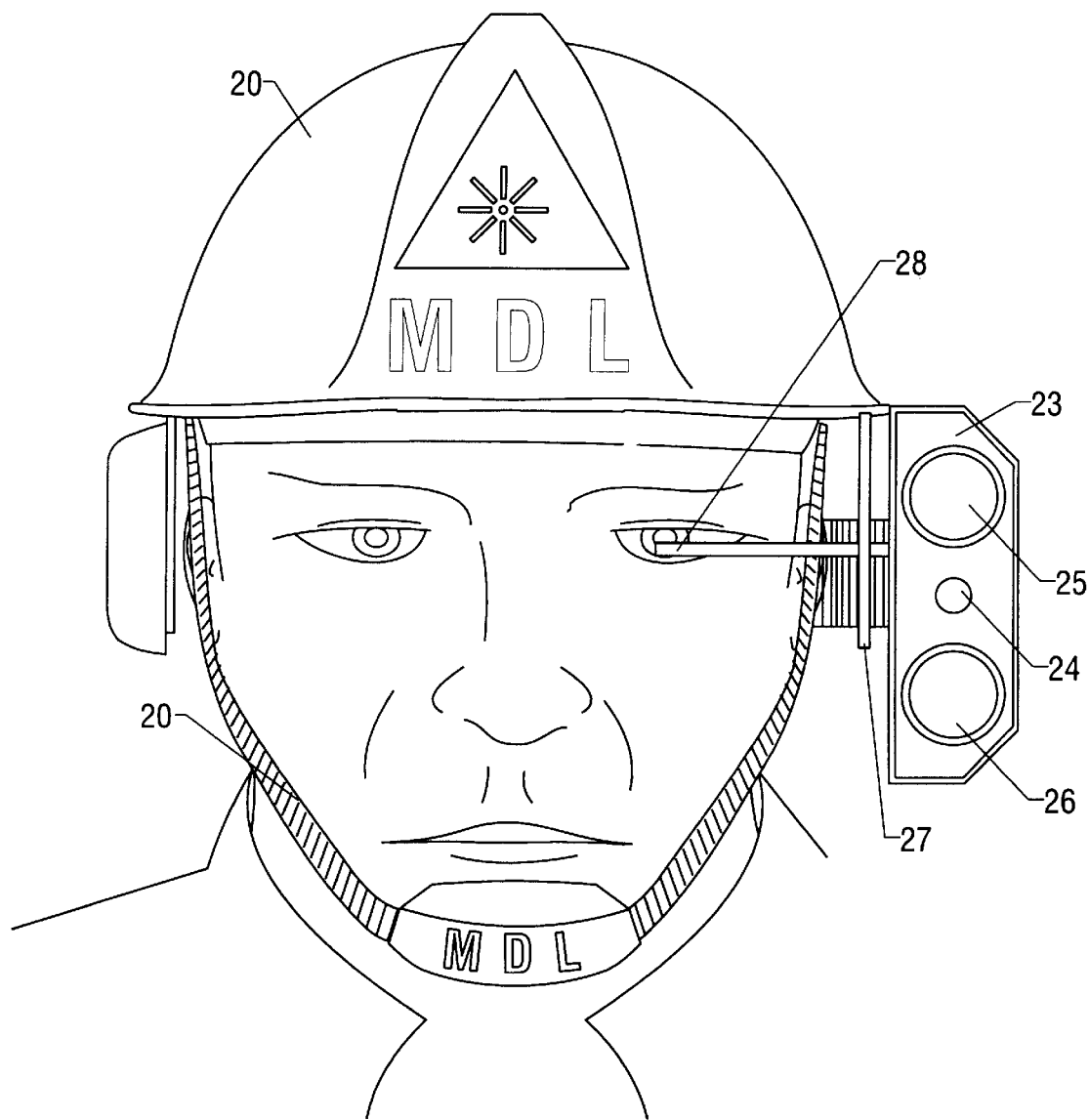
FIG. 4 is a front view of the headset shown in FIG. 3, in use.

A second example of a headset 4 is shown in FIGS. 3 and 4. The headset 4 shown in FIGS. 3 and 4 incorporates a helmet 20 which has a built-in compass module 21 with a control card 22. On the left hand side of the helmet 20 is located a laser range finding system 23 which includes a pointing laser 24, a transmit laser 25 and a receive laser 26. The laser system 23 is mounted to the helmet 20 by a rigid plate 27 on which is also mounted a visual cross-hair sighting device 28 which enables visual targeting of the laser system 23 by a user. Located on the right hand side of the helmet 20 is a counter balance weight 29 which balances the helmet 20 against the weight of the plate 27 and laser system 23.

Also provided is a GPS fixing bracket 30 to permit a user to fix a GPS antenna 5 to the helmet 20. This is an optional feature and is shown in phantom in FIG. 3.

The surveying equipment on the helmet 20 is connected via wires 31 into the surveying apparatus 1 shown in FIG. 1. The wires 31 correspond to the line 17 in FIG. 1. The only difference is that if the antenna is not mounted on the helmet 20, it may be mounted directly on the GPS 2 which may be incorporated into a backpack 35 (see FIG. 5) with the remainder of the apparatus 1.

Figure 5:
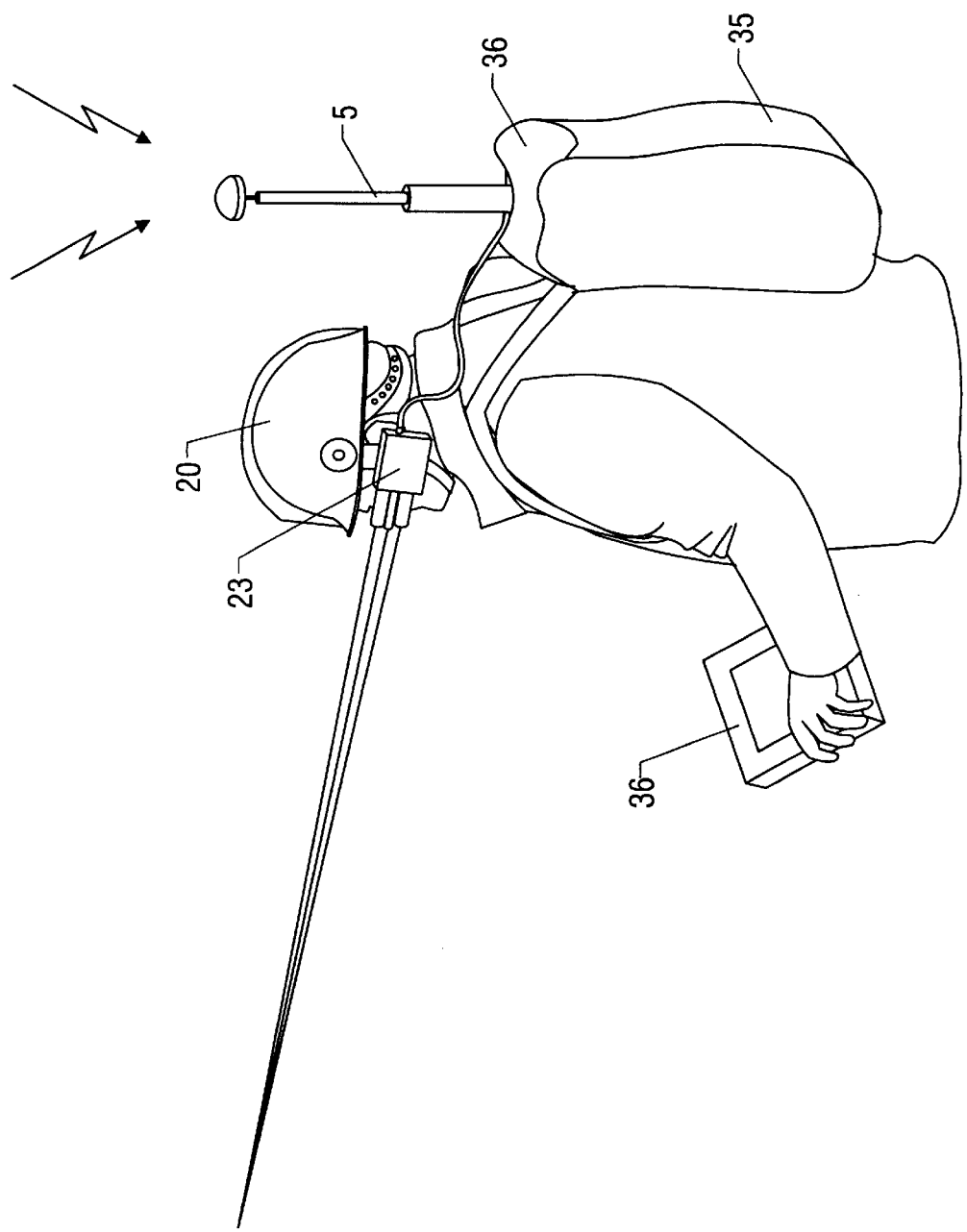
FIG. 5 shows the headset of FIGS. 3 and 4 with the surveying apparatus of FIG. 1, in use.

FIG. 5 shows the apparatus 1 in use with the helmet 20 and a portable input/output device 36 coupled to the apparatus 1.

A user can sight the laser system 23 on an object using the cross-hair 28 and/or pointing laser 24 and, using the input/output device 36, instruct the computer 3 to record the bearing and distance of the object from the user and the position of the user using the GCPS 2. This enables the position of the object being sighted to be determined.

Alternatively, if the object has already been surveyed and the information relating to it is held in a database, a user can sight on the object and using the input/output device 36 instruct the computer to display information relating to the object. The apparatus 1 will identify the object using the compass, range and GPS information and then display on the input/output device 36 information relevant to that object. The object may be, for example, a hill, river, building, road, railway track or any other geographical feature.

In addition, the apparatus may be supplemented by audio and/or video recording apparatus to record video or audio information relating to location respectively.

Modifications and improvements may be incorporated without departing from the scope of the invention.

I claim:

1. A surveying apparatus comprising:

a mounting device adapted to be worn on the head of a user; and mounted to the mounted device are (a) an optical sighting device to select a location to be surveyed, (b) a distance measuring device to measure the distance from the mounting device to the selected location, (c) a compass and an inclinometer to determine the bearing from the mounting device to the selected location, (d) a position fixing device to identify the position of the helmet;

and a processing device to receive output signals from the position fixing device, the measuring device, the inclinometer and the compass.

2. The surveying apparatus of claim 1, wherein the distance measuring device is a laser distance measuring device.

* * * * *